United States Patent

Shannon

[11] 4,033,065
[45] July 5, 1977

[54] FISHING LURE

[76] Inventor: Jesse Max Shannon, 3445 Pratt Ave., Lincolnwood, Ill. 60645

[22] Filed: Aug. 16, 1976

[21] Appl. No.: 714,815

[52] U.S. Cl. .............................. 43/42.13; 43/42.14
[51] Int. Cl.² ........................................ A01K 85/00
[58] Field of Search ........... 43/42.11, 42.13, 42.14, 43/42.4, 43.2

[56] References Cited

UNITED STATES PATENTS

| | | | |
|---|---|---|---|
| 1,734,883 | 11/1929 | Shannon | 43/42.13 |
| 3,143,824 | 8/1964 | Thomas | 43/42.11 |
| 3,805,437 | 4/1974 | Harris | 43/42.13 |

Primary Examiner—Warner H. Camp
Attorney, Agent, or Firm—Arnstein, Gluck, Weitzenfeld & Minow

[57] ABSTRACT

A fishing lure has a body including a pair of wire-like diverging arms with a weight and hook connected to one the arms. A V-shaped wire-like member is freely connected to the other arm of the body and has a pair of swively connected spinners of unequal size which function to slow the descent of the lure to a controlled rate after the lure strikes a water surface so that the lure is maintained in a desired attitude for attracting fish.

1 Claim, 4 Drawing Figures

FISHING LURE

BACKGROUND OF THE INVENTION

This invention relates to a fishing lure. In fishing for bass I have found it desirable to cast a lure to a likely spot and then permit the lure to sink at a controlled rate to a desired depth before beginning to retrieve it. A lure which plunges to the bottom, either head first or backwards, is not as effective as one which settles downwardly at a relatively slow rate of speed while maintaining its proper upright attitude. Experience has shown that greater success in catching fish is achieved when the lure is permitted to settle at a slow rate, immediately after the completion of a cast, than when the lure is retrieved, provided that the lure is maintained in a desirable "flat out" attitude.

SUMMARY OF THE INVENTION

One of the objects of this invention is the provision of fishing lure which will effectively attract fish during casting and trolling.

Another object of this invention is the provision of a fishing lure having means for controlling the rate of descent, following a cast, so that the lure will settle in the water at a desired slower rate while maintaining a desired flat out attitude.

A further object of this invention is the provision of a lure having spinners arranged so as to control the rate of descent of the lure in the water, thereby to prevent the lure from plunging downwardly upon striking the water.

A further object of this invention is the provision of a lure having spinners which function to maintain the lure in proper flat out attitude, either during conditions of descent or retrieval.

Other and further objects and advantages of this invention will become apparent from the following description when considered in connection with the accompanying drawings.

BRIEF DESCRIPTION OF A PREFERRED EMBODIMENT

Figure 1:
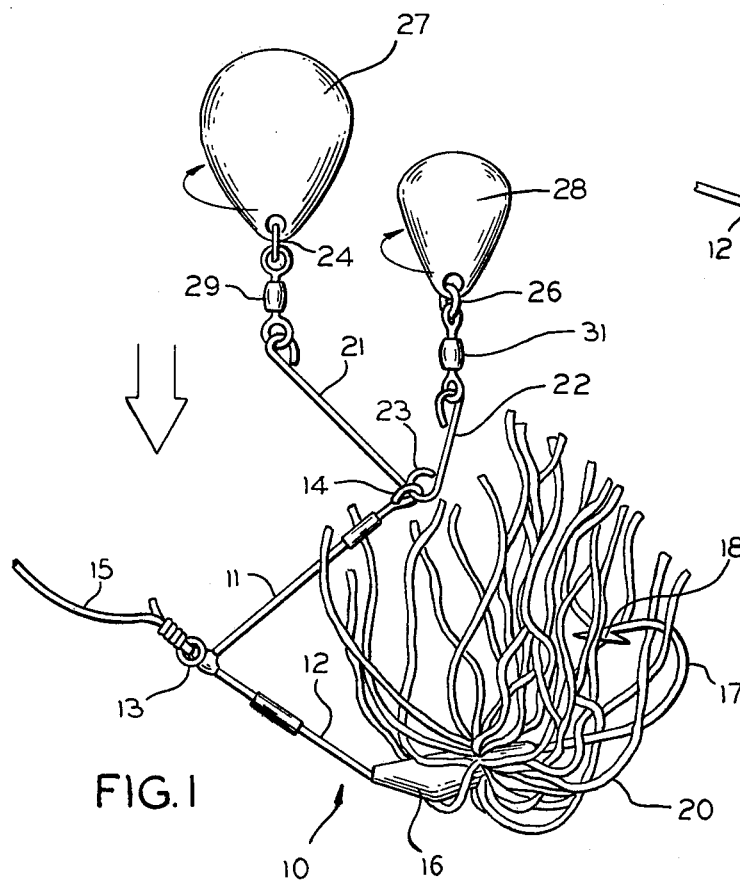
FIG. 1 is an elevational view of a lure, in accordance with my invention, showing the attitude of the lure in descending, immediately after striking a water surface.
Figure 3:
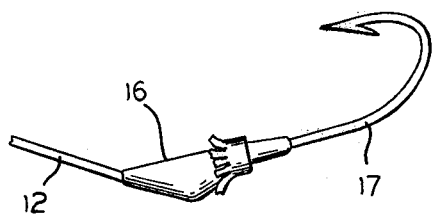
FIG. 3 is an elevational view of a detail.

The lure of the present invention comprises a body 10 having a pair of diverging wire-like arms 11 and 12 connected at one end by an eye or loop 13 to which is connected a fishing line 15. The arms 11 and 12 and loop 13 are disposed in a common plane. The distal end of arm 11 terminates in a closed eye 14 the axis of which is substantially coplanar with the plane of the arms 11 and 12. Preferably, the plane of the eye 14 should be approximately at a right angle to the plane of the arms 11 and 12. A bulbous body 16 is mounted on the end of the arm 12, in a well known manner, to provide a weight for the lure 10, and a hook member 17 provided with the usual barb 18 is connected to the arm 12 by the body 16. The hook member 17 is coplanar with the arms 11 and 12. As seen clearly in FIGS. 1 and 2, the loop 14 is disposed substantially directly above the center of the bulbous body 16 so that when the lure is in water its center of gravity is such that the lure is caused to assume an attitude of equilibrium in which the shank of the hook 17 is slightly inclined upwardly. The hook member may be concealed by a skirt of elongated strips 20 formed of plastic, rubber or other suitable material attached to the body 16. In addition to concealing the hook member the strips 20 afford more attraction for the fish in the use of the lure.

A pair of diverging wire-like arms 21 and 22 of unequal lengths are connected at one end to a loop 23, with the arms 21 and 22 and loop 23 being disposed in a common plane. The loops 23 and 14 are interconnected and so related that the arms 21 and 22 normally assume a position coplanar with the arms 11 and 12. The arms 21 and 22 terminate in closed loops 24 and 26, respectively.

Metal spinners 27 and 28 of concavo-convex type are attached to loops 24 and 26 by swivel connectors 29 and 31, respectively. As will be noted in FIG. 1, the spinner 27 is considerably larger in surface area than the spinner 28 and is disposed forwardly of the spinner 28. The lateral spacing between the loops 24 and 26 is such that the spinners 27 and 28 may rotate about their respective swivel connectors without interference with each other.

Figure 2:
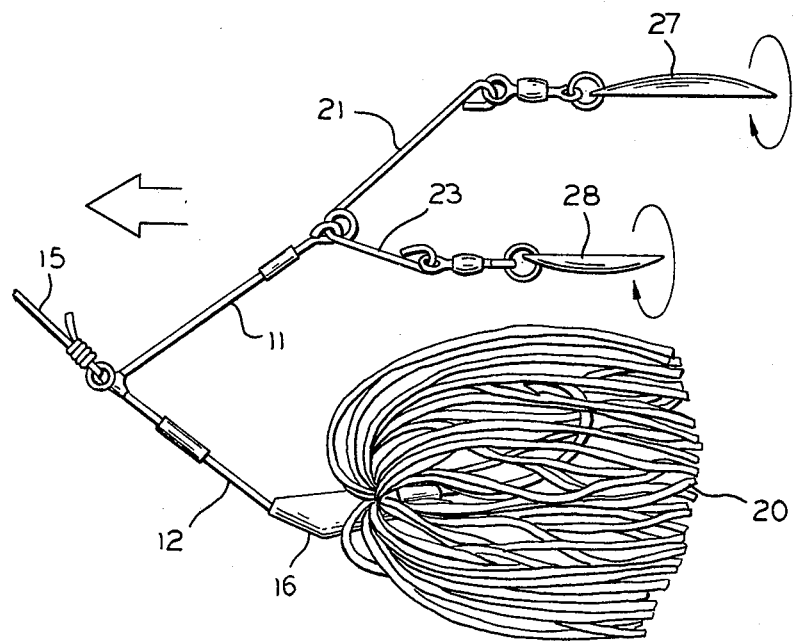
FIG. 2 is a similar view showing the attitude of the lure during retrieval.

From the aforedescribed description it will be seen that when the lure 10 strikes the surface of water it begins to settle downwardly and, in such movement, the spinners 27 and 28 assume the vertical positions illustrated in FIG. 1 and begin to rotate, as indicated by the arrows. This rotation slows the rate of descent of the lure in the water, while maintaining the lure in proper flat out attitude as illustrated in FIG. 1. It has been found that a lure descending in such fashion, at a slower rate than conventional lures is more attractive to fish and improves the potential for catching fish. When the lure has settled to a desired depth and the fisherman begins to retrieve the lure, arms 21 and 22 are caused to swing to the positions illustrated in FIG. 2 wherein the spinners 27 and 28 are now caused to rotate about respective horizontal axis, as shown. In such position, the lure 10 while being drawn horizontally through the water is maintained in a desired attitude, with the hook member 17 being disposed substantially in the same position, as when the lure is descending after striking the water surface. It will be noted that the arms 21 and 22 under either condition maintain a coplanar relatiohship with the arms 11 and 12.

It will be apparent that the arms 21 and 22 are spinners 27 and 28 are effectively placed to function as snag proofing means to render the lure weedless and that the resistance of the water on the spinners 27 and 28 causes them to rotate in a continuous fashion whether the lure in moving vertically or horizontally.

Figure 4:
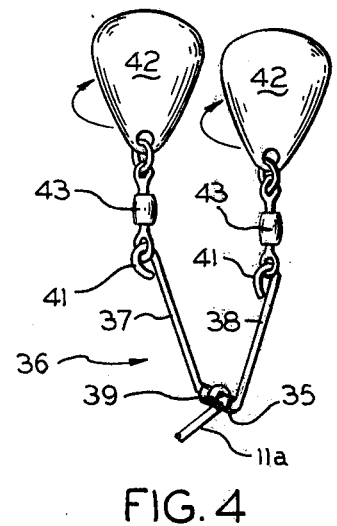
FIG. 4 is a fragmentary perspective view of a modified embodiment of my invention.

In the modified embodiment illustrated in FIG. 4, the body is identical to that above described and instead of loop 14 a tubular bearing 35 is soldered to the end of arm 11a. The axis of the bearing 35 is normal to the plane of the arms of the body. A generally V-shaped member 36 includes a pair of diverging arms 37 and 38 of equal lengths connected by a bight portion 39 which is rockably supported in the bearing 35. Each of the arms 37 and 38 terminates in a closed loop 41. Metal spinners 42 of equal size are connected to the loops 41 by swivel connectors 43. The lateral spacing between the loops 41 is such that the spinners 42 may rotate without interference with each other. It is noted that the diverging arms 37 and 38 are coplanar with each other so that in any position they are disposed in a plane always at a right angle to the plane of the arms of the body.

As should be apparent when the lure strikes the surface of the water and begins to descend, the spinners 42, 42 assume the vertical positions illustrated in FIG. 4 and control the rate of descent. As the lure is being retrieved the spinners 42, 42 assume horizontal positions similar to that shown in FIG. 2.

In all other respects the functions of both lures are identical.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:
1. A fishing lure comprising, a first pair of rearwardly diverging arms disposed in coplanar relationship and an eye member connecting adjacent ends of said arms for connection of a fishing line, weight means secured to one of said arms, hook and barb means carried by said weight means, a generally V-shaped member having legs of unequal lengths and pivotally connected at its apex to the other of said arms, a spinner swively connected to the end of each leg of said generally V-shaped member, one of said spinners having a larger surface area than the other of said spinners, said V-shaped member being free to swing relative to said pair of arms so that when the lure strikes water and begins a downward descent the spinners are caused to rotate about respective vertical axes thereby slowing the rate of descent of the lure while maintaining the diverging arms in a substantially vertical plane and in an attitude wherein the hook and barb means are disposed generally horizontally during such descent.

* * * * *